United States Patent [19]

Wheeler

[11] 4,236,365

[45] Dec. 2, 1980

[54] RIGID BUILDING COMPONENT AND METHOD OF MANUFACTURE

[75] Inventor: Robert G. Wheeler, Corvallis, Oreg.

[73] Assignee: Wood Processes, Oregon Ltd., Corvallis, Oreg.

[21] Appl. No.: 936,811

[22] Filed: Aug. 25, 1978

Related U.S. Application Data

[62] Division of Ser. No. 832,207, Sep. 12, 1977, Pat. No. 4,148,857.

[51] Int. Cl.$^2$ .......... E06B 3/70; B32B 3/02

[52] U.S. Cl. .......... 52/455; 52/309.16; 52/785; 428/81

[58] Field of Search .......... 52/455, 785, 309.11, 52/309.16; 428/54, 76, 81, 172

[56] References Cited

U.S. PATENT DOCUMENTS

| | | | |
|---|---|---|---|
| 656,772 | 8/1900 | Leaver | 52/785 |
| 1,908,263 | 5/1933 | Loetscher | 428/81 |
| 1,911,374 | 5/1933 | Loetscher | 144/309 N |
| 2,703,443 | 3/1955 | Lee | 156/257 |
| 3,168,763 | 2/1965 | Gilbert | 52/785 X |
| 3,573,145 | 3/1971 | Witkosky | 52/309.3 |
| 3,661,688 | 5/1972 | Wheeler | 264/119 X |
| 3,748,222 | 7/1973 | Wheeler | 162/165 |
| 3,829,337 | 8/1974 | Cheng | 156/63 |
| 4,072,548 | 2/1978 | Gerson et al. | 52/309.9 |

FOREIGN PATENT DOCUMENTS

| | | | |
|---|---|---|---|
| 2308748 | 11/1976 | France | 52/309.11 |

*Primary Examiner*—Alfred C. Perham
*Attorney, Agent, or Firm*—Klarquist, Sparkman, Campbell, Leigh, Hall & Whinston

[57] ABSTRACT

A rigid building component such as a door, table top or the like, is formed of coarse wooden particles mixed with adhesive, and a solid wooden edge frame, positioned between a pair of damp, substantially parallel, cellulosic fiber webs. A heated press is employed to compact the combination, particularly between the edge frame and the cellulosic fiber webs where the coarse wooden particles are greatly compressed to provide a durable edge. Under the heat and pressure applied in the press the particles are consolidated into a solid structure, while the damp cellulosic fiber webs are converted to tough exterior skins bonded to the coarse wooden particles. The sides of the rigid building component are suitably deeply embossed to provide a decorative paneled appearance.

3 Claims, 10 Drawing Figures

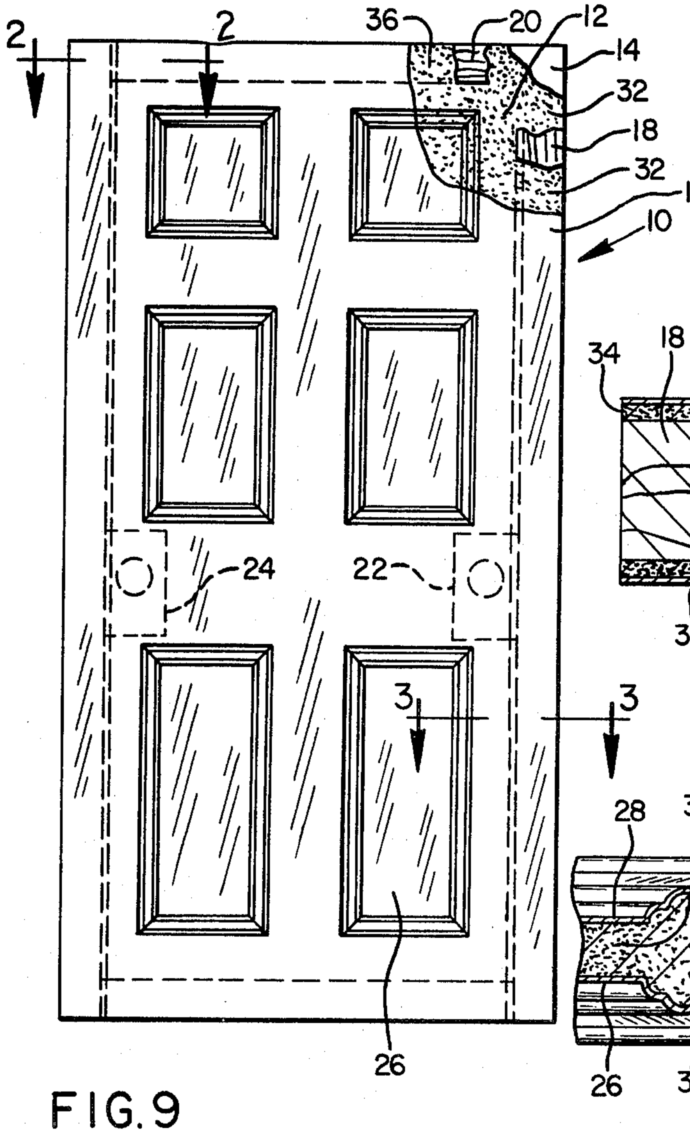
FIG. 1
FIG. 2
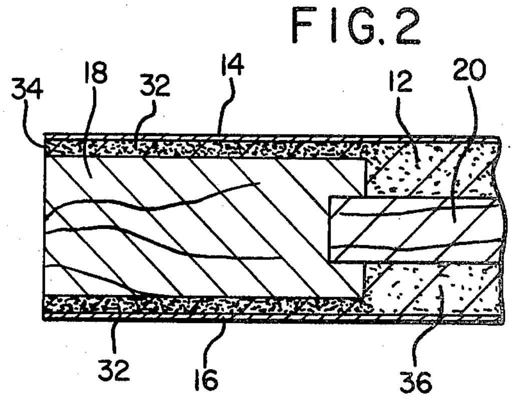
FIG. 3
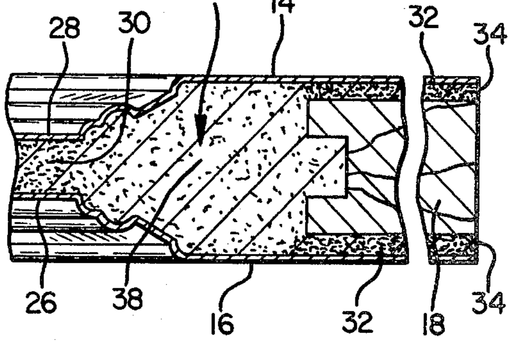
FIG. 9
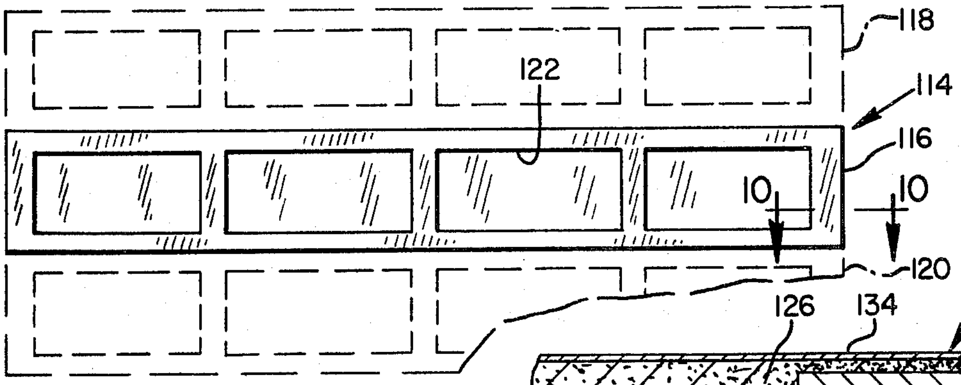
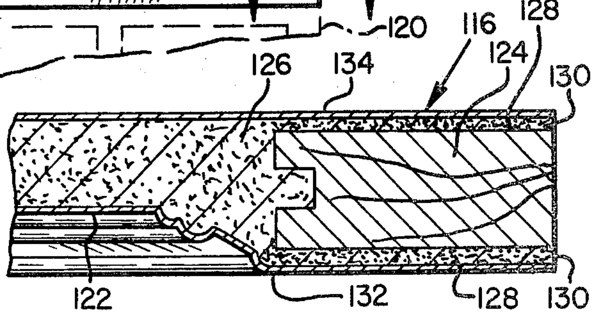
FIG. 10

RIGID BUILDING COMPONENT AND METHOD OF MANUFACTURE

BACKGROUND OF THE INVENTION

This is a division of application Ser. No. 832,207, filed Sept. 12, 1977 now U.S. Pat. No. 4,148,857.

The present invention relates to a rigid building component and method of manufacture, and particularly to a high quality, durable building component and an economical method of manufacturing the same.

High quality, rigid, building components, such as doors, table tops or the like, are expensive to manufacture particularly when a carved or paneled exterior appearance is desired. Of course hollow doors or essentially hollow doors filled with composition material and having plywood or similar surfaces are comparatively inexpensive, but lack the desired decorative appearance and durability in many cases. It is also possible to form doors entirely from composition material while relying upon large quantities of resin or plastic for forming the exterior surface. Unfortunately, the cost of the resin or plastic can be an objectionable factor, and the resulting appearance may be considered undesirable for some purposes.

In my previous U. S. Pat. No. 3,661,688, issued May 9, 1972, as well as prior patents mentioned therein assigned to the same assignee, a type of composite board laminate or panel board is described including a core formed of coarse wooden components provided with cellulosic fiber webs on either side thereof to form tough exterior skins, resulting in a durable and attractive product. Various caul plate inserts can be employed in forming this product for grooving the panel or supplying a desired embossed surface decoration. However, in the case of the panel described in U.S. Pat. No. 3,661,688, the panel edges are rounded and indented for greatly densifying the exposed coarse wooden particles whereby these edges are protected from moisture deterioration. This type of construction is not suitable for doors and the like where a fairly wide or thick and rigid construction is generally desired at the edges and elsewhere.

SUMMARY OF THE INVENTION

In accordance with the present invention, a rigid building component is formed by preparing a first wet web of cellulosic fibers and placing a mixture of discrete course wooden particles and adhesive on such web to a first predetermined level. Then a solid wooden edge member or frame is placed on the layer of wooden particles, followed by second deposition of wooden particles to a second level such that an approximately equal thickness of wooden particles is present on each side of the edge member. The combination is transferred on a caul plate to a heated press adapted for greatly compressing the assembly at an elevated temperature for setting the adhesive and forming a solid integrated structure including tough and smooth surfaced outer skins bonded to a consolidated core of wooden particles. The woode particles between the edge member or frame and the cellulosic fiber webs are compressed to the greatest degree, at least to a thickness of about one-half or less the original thickness. This highly densified edge of particles adjacent the wooden edge member or frame generally has a density at least equal to or substantially greater than that of natural wood, and is substantially solid in appearance and sufficiently durable for exterior as well as interior use. The caul plate or caul plates employed in the press for manufacturing the rigid building component suitably include inserts for forming a deeply embossed or indented pattern and presenting the appearance of a carved or paneled article of high quality acceptable for utilization in the most demanding exterior or interior decoration. The product is, however, quite inexpensive and is manufactured in substantially one press operation without the requirement of extensive carving or finishing work or multi-panel construction. At the same time, the completed structure is highly densified and solid, and is capable of application where superior material strength is required.

It is accordingly an object of the present invention to provide an improved rigid building component of high quality and economical construction.

It is another object of the present invention to provide an improved building component of solid and durable construction.

It is a further object of the present invention to provide an improved rigid building component of excellent strength and having other desirable physical properties.

Another object of the present invention is to provide an improved and economical method of manufacturing a rigid building component.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view of a rigid building component according to the present invention in the form of a door;

FIG. 2 is a cross-section, partly broken away, taken at 2—2 in FIG. 1 and enlarged;

FIG. 3 is a cross-section, partially broken away, taken at 3—3 in FIG. 1 and enlarged;

FIG. 9 is a side view of another building component according to the present invention in the form of a garage door; and FIG. 10 is a cross-section, partly broken away, taken at 10—10 of FIG. 9 and enlarged.

DETAILED DESCRIPTION

Figure 4:
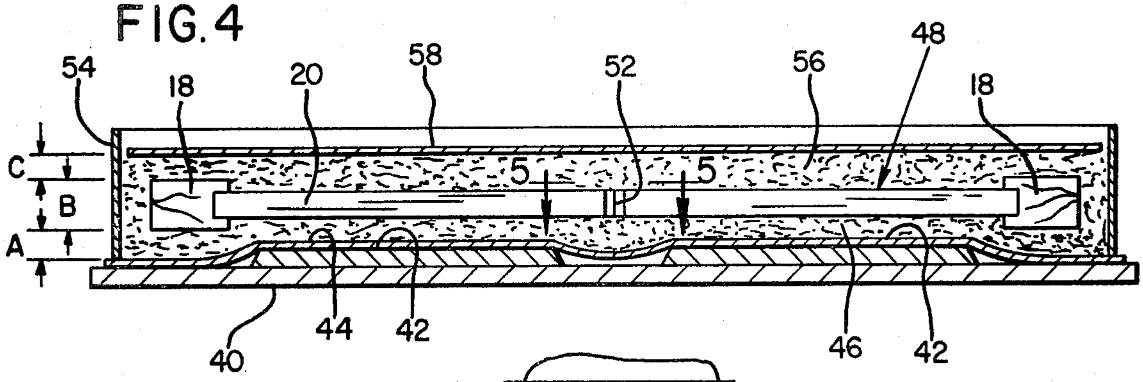
FIG. 4 illustrates a lay-up of elemental parts of a rigid building component according to the method of the present invention.

A rigid wood building component in the form of a door manufactured according to the present invention is illustrated in FIGS. 1-3. The door is of solid construction formed of consolidated coarse wood particles 12 which are adhered to one another, and to tough, smooth, high-density exterior skins 14 and 16 composed of consolidated cellulosic fibers. The skins are substantially parallel to one another and their toughness acts to protect the interior wood particles over the front and rear sides of the door.

The door is provided with a solid wooden edge frame comprising longitudinal stiles 18 grooved to receive rails 20 which form the upper and lower edges of the door. In addition, a lock block 22 or 24 may be joined to a stile approximately midway therealong for receiving a lock, door knob or the like. Hinges can be secured to the stile at the edge of the door opposite the lock block employed. The door is suitably deeply embossed on one or both sides, as illustrated at 26 and 28, to provide a decorative panel pattern, with the coarse wooden particles being more greatly compressed at 30 between the compressed panels to provide greater strength in a thinner area of the door. The adhered wood particles are consolidated to the greatest extent, however, in the regions 32 between the respective stiles and the parallel faces of the door whereby exposed edges 34 are very highly densified to be weather resistant and capable of receiving finishes. The wooden particles are densified to an intermediate extent within regions 36 between rails 20 and the parallel faces of the door, and to a lesser extent across the widest dimension of the door as for instance in region 38 in FIG. 3 where the particles, although still providing a solid structure of considerable strength, will nonetheless provide advantageous insulation and weight reduction properties as the result of a less dense construction in this area. The door described may be employed for normal purposes as either an external or internal house or building door.

Referring to FIGS. 4 through 8, illustrating the method according to the present invention, the aforementioned rigid building component is formed employing a compressing process wherein the constituent elements are greatly compressed and densified. Referring in particular to FIG. 4, the various component elements are shown as laid up upon a metal caul plate 40 provided with a plurality of up-raised inserts 42 contoured to form the aforementioned panel areas 26 in the door or the like. Over the caul plate is placed a damp cellulosic fiber web 44 suitably formed of repulped newsprint, and further including a resin material. For example, in forming this cellulosic web, a thousand pounds of dry waste newsprint may be charged into a paper breaker with enough water to bring the final repulped mass to about two percent consistency. The rough slurry formed in this manner is circulated through a single disc refiner until completely repulped. To this mixture, there is suitably added about 25 pounds of pale, thermoplastic, neutral hydrocarbon resin, for example a resin sold under the name "Piccopale 100" manufactured by Pennsylvania Industrial Chemical Corporation. The resin is first put into suspension with water and then mixed with the pulp slurry. To this mixture there is added about 25 lbs. of 50% solids paraffin wax emulsion size and from 60 to 80 lbs. of 35% solids phenol-formaldehyde resin. After complete mixture, the pH of the batch is adjusted to between 4.5 and 5, with about 2 lbs. of alum in order to obtain the precipitation of the wax and resins onto the cellulose fibers. The resulting slurry is then ready for forming a mat or web 44 on a suction head or cylinder having a pulp screen. The resulting web, after partial drying, is about 50% to 60% water and is desirably formed having a thickness of from 1/32 to 1/16 inch. This soft pulpy web is adapted to being formed and stretched into deeply embossed patterns as well as subsequently to form tough, smooth, high-density skins 14 and 16. The process of forming the cellulosic fiber web is further described in my U.S. Pat. No. 3,748,222 issued July 24, 1973.

The size of the cellulosic fiber web 44 is larger than the desired size of the door or other rigid building component, and after depositing the same on the caul plate 40, a quantity of discrete, coarse wood components or particles 46 is deposited hereover to a uniform level of thickness indicated by the dimension "A", much thicker than the thickness of web 44. The coarse wooden components are desirably wooden shavings coated with a suitable adhesive as hereinafter described. The shavings may be Douglas fir or shavings of any other appropriate wood. Shavings is taken to mean small slices of wood cut parallel to the fiber structure of the wood in the form of thin veneers about $\frac{1}{8}$ of a inch to 1 inch wide, of any desired length, and preferrably about 1/30 of an inch or less in thickness. However, instead of or in addition to shavings, other coarse wooden components may be utilized, as for example, wood chips, wood slices, wood veneer flakes and loose veneer sheets or flitches, which are, in any case, coated with an adhesive which will set or cure after being subjected to heat and pressure in the presence of steam. In a typical instance, a phenolic resin is utilized. For 100 lbs., dry weight, of coarse wood shavings or particles, approximately 6 to 8 lbs. of resin solids are employed and approximately 1 lb. wax size. The end product will preferably be less than 10% resin and usually about 6% resin producing full impregnation and bonding the product together as a solid unit, but it is seen the overall resin content is comparatively small and inexpensive. The wood particles are dried, e.g. to have a moisture content of no more than about 6 to 15%, and preferably in the vicinity of the lower end of that range, i.e. 6% to 8%.

Before deposition of the wood particles, an exterior frame 54 is suitably placed upon web 44 on the caul plate for holding the wooden particles and permitting spreading of the wooden particles to a given level. This frame, 54, is rectangular and larger than the desired dimensions of the door, while being smaller than the outside dimensions of the underlying caul plate whereby the frame 54 can rest upon the caul plate.

For a $1\frac{3}{4}$ inch thick door, the coarse wooden particles 46 should be deposited to a uniform thickness of approximately ∫ to $\frac{3}{4}$ inch as measured after vamping the layer of shavings in place. Then, the wooden edge frame 48 of the door is positioned upon the underlying layer of wooden particles in correct registry with the caul plate therebeneath. The wooden edge frame, as hereinbefore indicated, is formed of solid wooden stiles and rails, with the stiles being grooved to receive the rails at each end for establishing the exterior dimensions of the door. The frame is suitably preformed with the rails being glued to the stiles to form the solid, rectangular structure. In the particular instance under discussion, the stiles were nominal two-by-two boards, while the rails were nominal one-by-two boards. Consequently, the dimension "B" of the frame 48, as positioned on the underlying wood components, is approximately $1\frac{1}{2}$". The edge frame is, of course, smaller in exterior dimensions than the surrounding exterior frame 54 employed to contain wood particles during lay-up.

Figure 5:
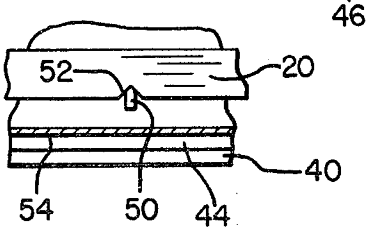
FIG. 5 is a view, partially broken away as taken at 5—5 in FIG. 4.

In order to position the completed edge frame 48 correctly on the underlying wooden particles, the caul plate 40 is provided with a pair of upstanding dowels 50 which are adapted to be received in notches 52 of rails 20 as particularly illustrated in FIG. 5. The notches 52 are suitably positioned approximately midway of the rails, and consequently the dowels are positioned approximately midway across the ends of the underlying caul plate 40. As a consequence of the alignment achieved, the deeply embossed panels, as illustrated at 26 in FIG. 1, will be positioned correctly on the door, since the inserts 42 will then register properly with the door.

After positioning the frame 48 on the underlying wooden particles, further wooden particles of the same composition are spread within and around the edge frame and outside the edges of the frame, such that a uniform layer of wooden particles is provided to the further level indicated by the dimension "B".

After wooden particles have been deposited to the height of "A" plus "B" a further layer of similarly constituted particles 56 is deposited thereupon to a further depth indicated by dimension "C", wherein "C" is approximately equal to "A". Thus the further depth of particles is suitably from $\frac{1}{2}$ to $\frac{3}{4}$ inch. After such deposition, a damp cellulosic fiber web 58 is placed upon the layer of wooden particles within frame 54 to substantially cover the same, wherein the web 58 is suitably identical in composition and thickness to the underlying web 44. It will be seen the total thickness of the "sandwich" thus formed, not counting webs 44 and 58, will be from $2\frac{1}{2}$ to 3 inches. The "sandwich" is placed between the platens of a steam heated multiple opening platen press, part of which is illustrated at 65 in FIG. 8, the said "sandwich" being indicated at 58 resting upon caul plate 40 after removal of frame 54. The caul plate 40 is positioned on an underlying steam heated platen 60 of the multiple opening press, and a mating caul plate 62 is suitably secured to a second platen 64 immediately above the "sandwich", caul plate 62 including inserts for stamping the desired deeply embossed pattern into the opposite side of the door.

The multiple platens 60, 64, etc., of the hot press 65 rest on guide bars 66 and in particular upon shoulders 68 such that a platen can move no further downwardly than the position illustrated, but can be moved upwardly by a hydraulic ram (shown in FIG. 8) below the bottom platen which forces the platens together and against the top platen of the press. Stops 70, secured to the undersides of the platens, maintain the minimum distance between platens as the same are forced vertically upward, thereby establishing the finished thickness of the door or other rigid wooden building component being formed. It is seen substantial compression and consolidation of the wooden particles takes place to result in a $1\frac{3}{4}$ inch thick door. The compression is particularly pronounced around the edges where the wood particles are highly compressed between the edge frame and the exterior skins to produce effectively a sealed, weatherproof edge surface, particularly after application of a finish. The platens are heated internally, suitably by steam, for raising the temperature of the building component being formed to a temperature preferably in the range of 275° F. to 350° F. The temperature in general should be higher than the boiling point of water whereby steam will be formed from moisture primarily contained in the damp webs 44 and 58. However, such temperature should be below the charring point of paper in order that the webs will not become charred.

The pressure applied by the hydraulic ram of the press is suitably in the range from 50 to 200 PSI, (and is desirably in the neighborhood of 100 PSI, or somewhat greater for deeply embossing panels). The heat and pressure is maintained upon the "sandwiches" for approximately 10 to 30 minutes whereby the wooden particles are consolidated and densified to provide a solidified product, while the surface webs 44 and 58 are compacted and converted to dense, tough, smooth skins of compacted cellulosic fibers on either side of the core of consolidated wood particles. The exterior of the skins is compressed to be smooth, tough and hard without any fibrous protrusions from the exterior, duplicating the pattern of the caul plate and adapting the skins to receive a desired finish. The skins are toughened and densified to a durable surface by the heat and pressure applied and as a result of the aforementioned small percentage of additives provided in forming the pulp web. These skins become interlocked with the irregular surfaces of the wood particle core thereunder.

During the 10 to 30 minute period the "sandwich" is within the press, the wood fibers and lignins of the wood particles are softened by the heat and steam and the fibers will slip with respect to one another under pressure permitting the compaction to the desired thickness and the relief of stresses in the wooden core formed thereby. The steam generated within the "sandwich" escapes primarily through the interstices of the wooden particles and around either side of the rails 20 at the upper and lower ends of the same, this being one of the advantages of having a narrower rail. The action of the heat and steam not only results in compaction of the particles, but also substantially sets or cures the adhesive between the wood particles for tightly and solidly adhering and bonding the same together throughout the compacted particles to form a solid core of reduced thickness, as well as tightly adhering and bonding the particles to a tough, exterior skins formed by webs 44 and 58. At this same time, the wooden particles become firmly bonded to the interior frame 48 by means of the adhesive material applied to the wooden particles. Thus the entire door product is substantially formed in one compressing operation.

The wooden particles become most greatly densified in the regions between the wooden frame and the webs 44 and 58 forming skins 14 and 16 as illustrated in FIGS. 2 and 3. The wooden particles in region 32 typically take on a density of 55 to 60 lbs. per cubic foot as compared with the density of natural wood of 35 lbs. per cubic foot. Thus the edge 34 is made weatherproof and suitable for finishing. The region 30 as well as regions 12 have a density of approximately 40 lbs. per cubic foot, so the edges around the rails are also weatherproof and suitable for finishing. Areas 38 in less compressed portions of the door have a density of approximately 25 to 30 lbs. per cubic foot, or less than natural wood, providing a solid but better insulated and lighter weight product. Also, as a result of heat treating, the finished product is stabilized and maintains its dimensions and thickness even with subsequent exposure to moisture. The entire product is suitable for receiving a finish, including the tough outer skins 14 and 16, the edges of the rails and stiles and the highly densified wood particles between the rails and stiles and the skins. The strength of the finished product is excellent and is comparable to conventional solid wood products, the product having a high shear strength and modulus of rupture.

It will be recognized that the door product, as initially formed in press 65, will actually extend beyond the dimensions of the wooden edge frame 48 inasmuch as the edge frame is smaller in outside dimensions than the exterior frame 54 used to contain the wood particles. Since the frame 54 is removed before the "sandwich" is placed in the press, the additional margin of wood particles outside the edge frame 48 allows for some loss in particles around the exterior edges without affecting the dimensions or density of particles in the finished product. Then, after the product is fully formed in the press between appropriate caul plates, the extra margin of material is trimmed from the door, down to the exterior dimensions of edge frame 48 or even therewithin in order to dimension the door or other finished product as desired. There is no need for the edge frame 48 to be formed of finished lumber, but rather the same can be rough cut and slightly oversize whereby the final trimming step can finally dimension the product and provide a finished edge on the exposed portions of stiles 18 and rails 20.

Figure 7:
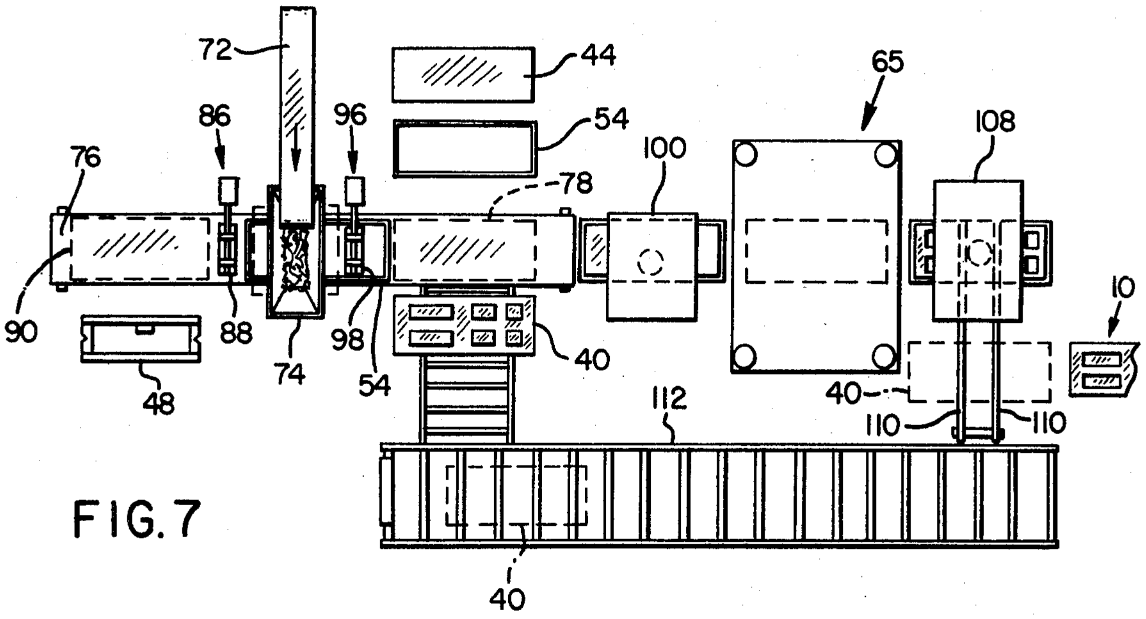
FIG. 7 is a plan view showing a layout of equipment for manufacturing a rigid building component in accordance with the present invention.
Figure 8:
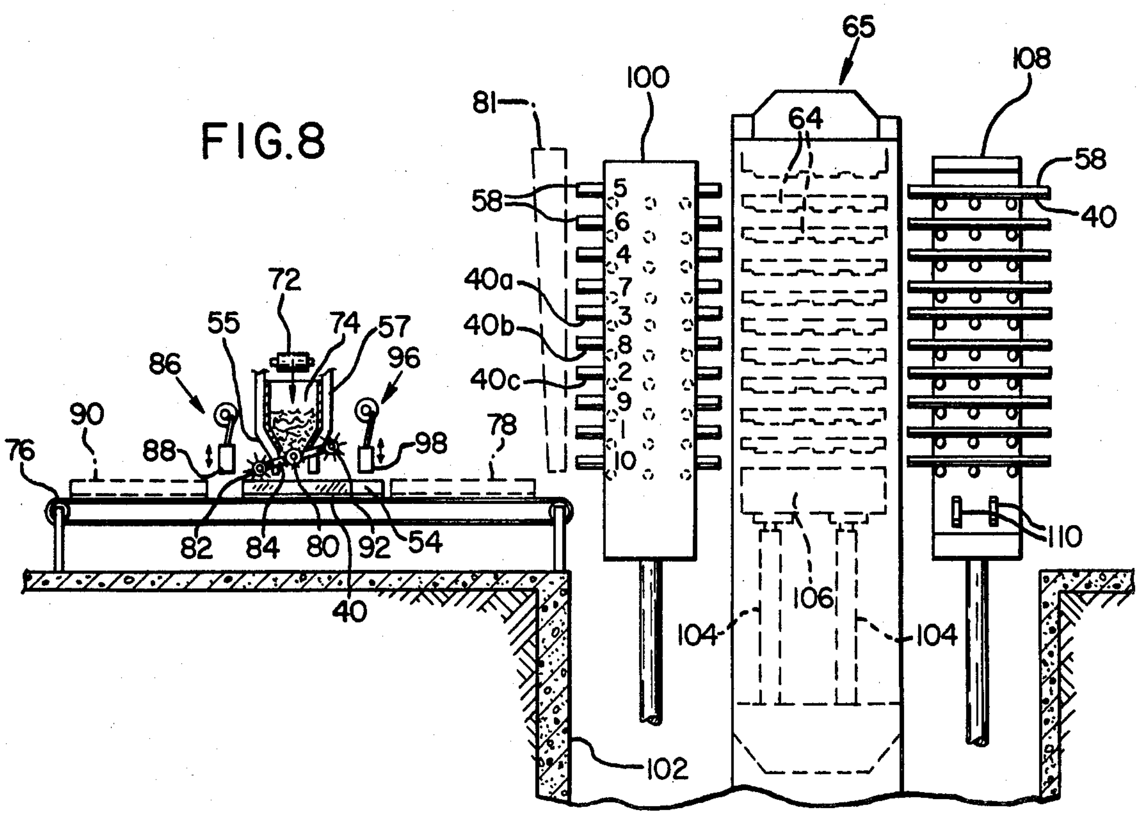
FIG. 8 is an elevational view of a portion of the FIG. 7 layout.

Referring to FIGS. 7 and 8, which are schematic representations of a portion of the process and equipment for making rigid wooden building components such as doors according to the present invention, the coarse wood particles are supplied to a conveyor 72 by means of which they are delivered to a hopper 74 forming part of equipment for spreading the wood particles uniformly across and within exterior frame 54 positioned on caul plate 40 carried by conveyor 76. Prior to delivery via conveyor 72, the wood particles are mixed with a phenolic resin, suitably a phenol-formaldehyde water soluble resin. The resin is applied to the wood particles in liquid form comprising about 35% solid resin and 65% water in a blender such as an attrition mill blender (not shown). The proportions of resin and wood particles are such that for 100 lbs. of coarse wood particles, approximately 6 to 8 lbs. of resin solids are added. About 1 lb. of wax solids is also added in the blender and in this blender, the wood particles will be brought to about 15 to 20% moisture content. After mixing so as to obtain wood particles with a coating of resin and wax, the particles are dried in a dryer (not shown) to no more than about 6 to 15% moisture content and preferably in the vicinity of the lower end of that range. The dryer employs heat essentially to drive off moisture, but the heat is low enough to avoid polymerizing the resin which is later to be cured in a heated press.

Among the resins suitable are the following phenol-formaldehyde resins: the product designated GP-3192 manufactured by the Georgia Pacific Corporation, Portland, Oregon; the product designated Cascophen MB-37 manufactured by the Borden Chemical Company, New York, New York; products designated Monsanto PF 575, PF 890-M and PF 891-M, manufactured by the Monsanto Chemical Company, Plastics Division, Seattle, Washington. Alternatively, a melamine-formaldehyde resin may be employed such as MF 305 manufactured by the Monsanto Company, Plastics Products and Resin Division, Eugene, Oregon. An example of the wax size employed in the product designated Paracol 1276 which comprises a paraffin-based wax emulsion manufactured by Hercules, Inc., Wilmington, Delaware. The above-listed products are to be taken in an exemplary and not in a limiting sense.

Prior to the deposition of the resin coated wood particle material, the caul plate 40 is placed on conveyor 76 at the position indicated by dashed lines at 78 in FIG. 7. The damp, cellulosic fiber web 44 is then laid down over the caul plate, followed by the positioning of an exterior frame 54 thereover. The conveyor 76 is then operated to move the assembly beneath hopper 74 from which wood particles are distributed by means of a rotating drum 80 having a number of radially extending ribs around its periphery. As the drum 80 rotates, conveyor 76 moves for distributing the wood particles across the cellulosic fiber web 44 within the confines of exterior frame 54. Drum 80 turns and conveyor 76 is adapted to move at correct speeds for depositing wood particles slightly higher than the level "A" illustrated in FIG. 4. After deposition of the particles, the conveyor moves frame 54 and its contents under a picker wheel or brush 82 mounted on one end of beam 84 and having a multiplicity of radially extending bristles or tines which contact the wood particles. The picker wheel 82 rotates in a counterclockwise direction for smoothing the level of the particles within frame 54 and removing the excess which is taken up by vacuum means 55. After smoothing the particles across the length of frame 54, the beam 84 is rotated to a horizontal position. Thereafter, the frame 54 and its contents pass under a tamping device 86 including a tamping bar 88 extending transversely of the conveyor which successively contacts the wood particles within frame 54 and compacts the same to the proper level "A" as hereinbefore mentioned.

The conveyor then carries caul plate 40, frame 54 and its contents to a position indicated in dashed lines at 90, at which point edge frame 48 is placed in its proper position upon the compacted wooden particles. Then, the conveyor 76 is reversed and drum 80 is rotated at the correct speed relative to motion of conveyor 76 for depositing a further quantity of wood particles within frame 54 to a level "B" plus "C" as hereinbefore illustrated in FIG. 4. The beam 84 is also rotated further in a clockwise direction for lowering a second picker wheel 92, which carries a multiplicity of bristles or tines adapted for smoothing the layer of wood particles within frame 54 to slightly above the desired level as wheel 92 rotates. Vacuum means 57 removes excess particles. A second tamper 96, including a tamping bar 98, is operated for compacting the particles to the further level "B" plus "C" as illustrated in FIG. 4. Thereafter, beam 84 is moved to a horizontal position and caul plate 40 is transported by means of conveyor 76 toward a first elevator rack 100. As the caul plate returns to the position indicated at 78, a further damp cellulosic fiber web (58 in FIG. 4) is placed on top of the particles within frame 54, and frame 54 is then removed, leaving the upper and lower webs, the interior frame 48 and the wooden particles surrounding frame 48 between the webs positioned on caul plate 40. Caul plate 40 is now moved into elevator rack 100, the latter comprising an elevator movable downwardly and upwardly from a pit 102 and suitably including a plurality of horizontal racks in the form of roller cases so that successive caul plates 40*a*, 40*b*, 40*c*, etc., can be easily slidably received within elevator rack 100. In the particular embodiment illustrated, the caul plates and their contents are to be received within steam heated multiple opening platen press 65, which has ten openings, and therefore elevator rack 100 is adapted to receive ten caul plates in the positions numbered 1 through 10 in FIG. 8. The positions 1 through 10 are numbered in the order it is desired to receive the caul plates within the elevator rack. First, the elevator rack is moved downwardly and a caul plate is received in position 1. Then, the elevator rack is moved further downwardly and a caul plate is received in position 2 (skipping a position 9 between 1 and 2). Downward movement of the elevator rack continues, stopping at alternate positions numbered 3, 4 and 5 to receive further caul plates. At this time elevator rack 100 will be in its lower-most position and will now move upwardly to receive caul plates successively at intermediate positions 6 through 10 skipped in the downward pass. In this way, efficient use is made of the elevator movement. The elevator rack 100 will now carry 10 caul plates which can be introduced into press 65 utilizing pusher means 81 which suitably moves through a slot in the elevator rack.

Figure 6:
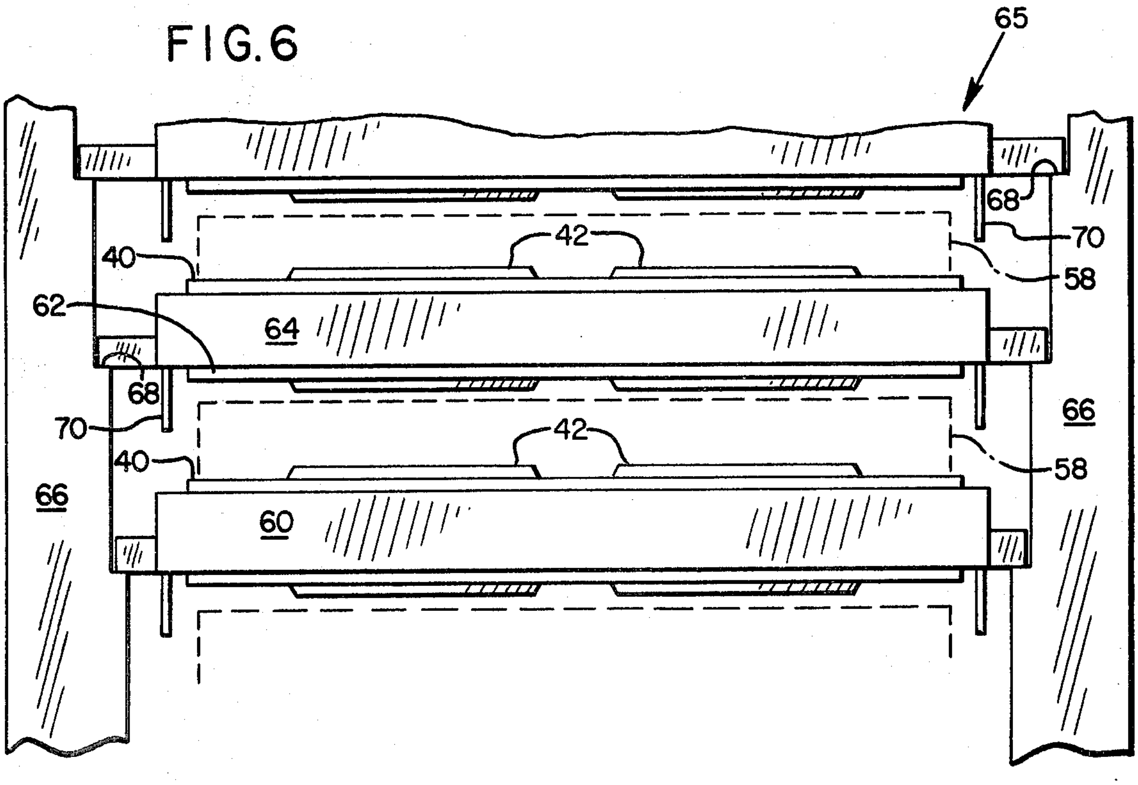
FIG. 6 is a partially broken away elevational view of a hot press employed according to the method of the present invention.

The press 65 is illustrated in FIGS. 8 and 6 in its open position for receiving the respective caul plates 40*a*, 40*b*, 40*c*, etc., and their contents. The press includes an elevating ram in the form of hydraulic pistons and cylinders 104 for raising the lower-most platen 106. As hereinbefore described, action of the hydraulic ram forces the platens together whereby to compress and consolidate the "sandwiches" disposed between caul plates into the shape of the desired product. As pressure is maintained by press for a period of 10 to 30 minutes, further caul plates received an assemblage of cellulosic fiber webs, wood particles and edge frames contained therewithin for introduction into elevator rack 100. At the end of the designated period of compression, press 65 is opened and the further caul plates now positioned in elevator rack 100 are urged into the press, the new caul plates forcing the caul plates containing the compressed product to the right onto elevator rack 108 where such caul plates are received on rollers in ten positions similar to the positions of elevator rack 100. After receiving caul plates containing the compressed products, the elevator rack 108 is moved downwardly, and each caul plate in turn is received upon simultaneously operating conveyor belts 110 which are narrow and adapted to pass between sets of rollers in elevator rack 108. The finished door is lifted from the caul plate, either manually or by use of a vacuum pickup (not shown), while the caul plate is returned via conveyor 112 to a position adjacent conveyor 76 so the same may be conveniently returned to position 78 for repeating the forming process. Thus, the overall process, as illustrated in FIGS. 7 and 8, suitably employs 20 lower caul plates, ten of which are in press 65 at a given time, while the other ten are receiving the combination of damp cellulosic fiber webs surrounding wood particles and frames therebetween. After removal of a door from conveyor belts 110, the same is suitably taken to a location (not shown in the drawing) where the edges are trimmed to size.

Returning to FIGS. 1 through 3, it is again noted the process produces extensive compression of the wood particles, particularly in areas 32 between stiles 18 and skins 14 and 16. Thus, the wood particles initially disposed on each side of stile 18 have a thickness of from ½ to ¾ inch, or several times as great as the same dimension after compression. After compression, each of these areas have a thickness of approximately ⅛ inch, taking on a density of approximatey 55 to 60 lbs. per cubic foot as hereinbefore mentioned. Therefore the weathering problem attendant to usual low or medium density particle board construction is solved since only the higher density portions of the product are exposed and have the appearance and properties of a high density solid material. Furthermore, areas 36 between a rail and a cellulosic skin, as exposed at the upper and lower edges of the door, are also compressed to a thickness of slightly less than ½" from an initial thickness of wood particles disposed in these areas of about 1⅛ inches, and are thus reduced by at least about one-half their original thickness. Consequently, sealing properties are also provided at the upper and lower edges of the door. Of course, the rails could be made thicker than the initial ¾" (for nominal one-by-two rails), but the compression obtained allows for ample durability plus the aforementioned desirable property of allowing the escape of steam during the compressing process between the rails and cellulosic fiber webs. In general, compression of the particles at the edges of the product is desirably by at least about one-half of the original thickness of the particles, with substantial compression also taking place elsewhere in the product to result in a unitary solid structure. The cellulosic fiber webs are compressed to an extent such that the resulting skins are pratically indistinguishable from the layer of wood particles thereunder, and the actual thickness is somewhat dependent upon the contour of the wood particles which the cellulosic fiber web seal up to provide a smooth and durable surface capable of receiving a finish or the like. In any case, the compressed fiber web is less than 1/64 inch in thickness.

The rigid building component manufactured according to the present invention has been described herein as taking the form of a conventional house door which may be used for either exterior or interior purposes. However, the process is not limited to door manufacture and may, for example, be employed in the formation of table tops, drafting tables and the like, particularly where an edge machinable surface comprising the hereinbefore described edge frame is of advantage. Many other types of panels can be formed employing the present invention. Another example is illustrated in FIGS. 9 and 10 and comprises a foldable garage door 114 including a long panel 116 which is suitably hinged to adjacent similar panels 118 and 120 by means not shown. The panels are desirably embossed as at 122, by means of caul plate inserts as hereinbefore described, to provide a decorative pattern. Each of the panels is manufactured to include an interior edge frame as hereinbefore described, with a grooved stile 124 being illustrated in the FIG. 10 cross-section. Stile 124 is adapted to receive mating rails at its upper and lower extremities. The interior wood particles 126 are particularly compressed in areas 128 on either side of stile 124 whereby the edges 130 are highly densified and adapted to receive a finish coating or the like. These edges are therefore substantially weatherproof to the same extent as or to a greater extent than natural wood, whereby the garage door can be used in place of garage doors manufactured by more conventional construction techniques. Also, of course, the door's durability is enhanced by the cellulosic fiber skins 132 and 134 adhered to the front and rear of the garage door panel.

It will be observed the panel 116 of FIGS. 9 and 10 is deeply embossed on only one side, as by utilizing a matching caul plate insert. Consequently, only one caul plate, the lower caul plate, need be employed in manufacturing such a panel. The component parts of the door panel are laid up on a lower caul plate, as hereinbefore described, such caul plate including an insert for the deeply embossed pattern at 122. The remaining or upper caul plate may be omitted from the press 65 as illustrated in FIGS. 6 and 8, inasmuch as the opposite side of the panel is flat and can be formed by the press platen alone. Alternatively, of course, a flat upper caul plate can be employed.

The construction according to the present invention is of great advantage in providing a solid door, panel, or the like, in substantially one compression operation. The product is low in cost because of the economy of the procedure and the component elements utilized. The only solid natural wood components required are the stiles and rails of the edge frame, and perhaps a lock block. This economy is present not only in the manufacture of a door as illustrated in FIGS. 1 through 3, but is particularly evident in the manufacture of large panels for a garage door, as illustrated in FIGS. 9 and 10. The conventional garage door, in order to obtain proper strength and weatherability, is usually made up of a number of smaller subpanels which are then joined together by a skilled carpenter. However, the panels manufactured according to the present invention are not only solid and durable, but can be manufactured in one compression operation as an integrated unitary entity,providing the desired strength, weatherability and appearance. Decorative embossing, which is popular with doors of this type but ordinarily expensive, can be achieved with practically no greater expense by the process of the present invention. Of course, the decorative paneling features are also relevant to the house door as illustrated in FIGS. 1 through 3 wherein an ornately carved appearance is easily procured by employing the desired inserts for the caul plates employed.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

What is claimed is:

1. A rigid building component comprising:

a core of consolidated and compacted coarse wooden particles disposed between a pair of substantially parallel densified outer skins of cellulosic fibers firmly bonded to said core, said coarse wooden components including adhesive material coated thereupon and dispersed throughout said rigid building component for adhering said particles into a solid structure, and an interior solid wood edge frame positioned within said coarse wooden particles around the peripheral edge of said building component, said edge frame extending completely around said building component and comprising a pair of stiles on either side of said building component joined by a pair of rails at the upper and lower edges of said building component, each of said stiles and rails comprising a board of predetermined thickness having flat sides substantially parallel to said outer skins, the coarse wooden particles between the sides of said boards and said outer skins being compacted to have a density substantially greater than the density of said wooden particles located centrally of said building component within said solid wood edge frame to provide solid durable wooden edges adjacent said edge frame around the periphery of said building component.

2. The rigid building component according to claim 1 further including deeply embossed portions within said edge frame in registry with which said coarse wooden components have an intermediate density.

3. A rigid building component comprising:

a core of consolidated and compacted coarse wooden particles disposed between a pair of substantially parallel densified outer skins of cellulosic fibers firmly bonded to said core, said coarse wooden components including adhesive material coated thereupon and dispersed throughout said rigid building component for adhering said particles into a solid structure, and an interior solid wood edge frame positioned within said coarse wooden particles around the peripheral edge of said building component, the coarse wooden particles between the sides of said edge frame and said outer skins being compacted to have a density substantially greater than the density of said wooden particles located centrally of said building component within said solid wood edge frame to provide solid durable edges adjacent said edge frame around the periphery of said building component, said solid wood edge frame comprising a first pair of parallel wooden stiles grooved at their respective ends to receive a pair of wooden rails joining said stiles, said rails being narrower in transverse dimension than said stiles wherein the wooden particles between said stiles and said outer skins have a greater density than the wooden particles between said rails and said outer skins.

* * * * *

UNITED STATES PATENT AND TRADEMARK OFFICE

CERTIFICATE OF CORRECTION

PATENT NO. : 4,236,365

DATED : December 2, 1980

INVENTOR(S) : ROBERT G. WHEELER

It is certified that error appears in the above—identified patent and that said Letters Patent is hereby corrected as shown below:

Column 1, line 49, "course" should have been --coarse--.

Column 1, line 61, "The woode" should have been --The wooden--.

Column 4, line 11, "hereover" should have been --thereover--.

Column 4, line 49, "∫" should have been --1/2--.

Column 4, line 49, "vamping" should have been --tamping--.

Column 4, line 50, "of" (second occurrence) should have been --for--.

Column 4, line 66, after "contain" and before "wood" there should have been --the--.

Column 9, line 25, "received" should have been --receive--.

Signed and Sealed this

*Fifth* Day of *July 1983*

[SEAL]

*Attest:*

GERALD J. MOSSINGHOFF

*Attesting Officer* *Commissioner of Patents and Trademarks*